Patented Sept. 5, 1922.

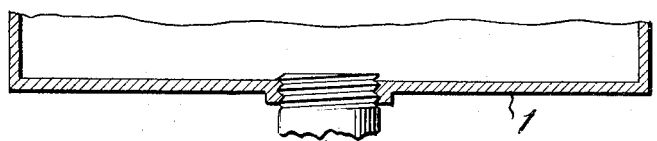
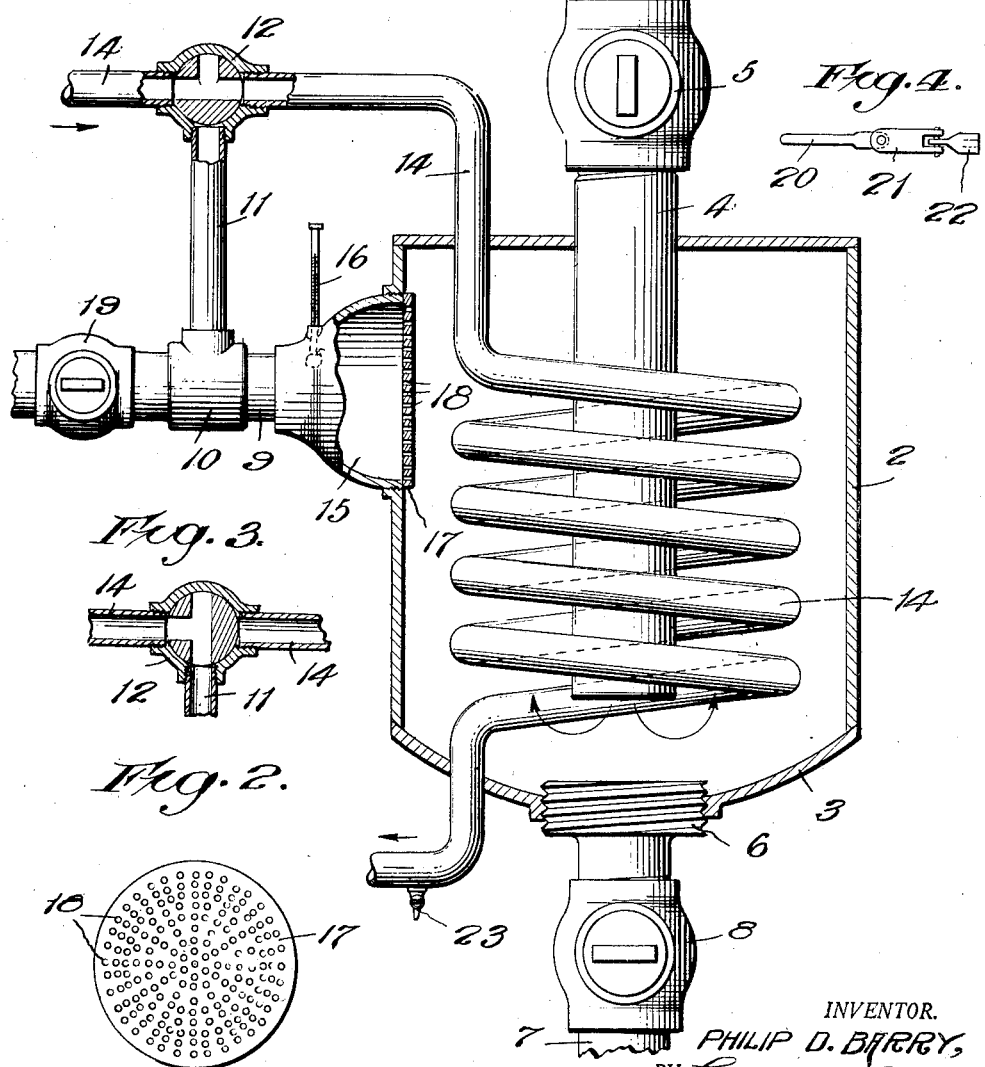

1,428,205

UNITED STATES PATENT OFFICE.

PHILIP D. BARRY, OF MIAMI, ARIZONA.

OIL TRAP AND HEATING DEVICE.

Application filed October 15, 1919. Serial No. 330,875.

*To all whom it may concern:*

Be it known that I, PHILIP D. BARRY, a citizen of the United States, residing at Miami, in the county of Gila and State of Arizona, have invented new and useful Improvements in Oil Trap and Heating Devices, of which the following is a specification.

My invention relates to apparatus for burning petroleum or other liquid fuels for generating steam in a boiler or for other purposes, and it consists in the combination of the various parts whereby the liquid fuel is preheated before delivery to the burner to facilitate vaporization of the fuel and to increase the economy and efficiency of operation of the burner, and my invention also provides means whereby the cleaning of the device is facilitated, so as to increase the dependability of the apparatus.

One form in which my invention may be embodied in practice is diagrammatically shown in the accompanying drawing wherein—

Fig. 1 represents a partial sectional elevation of the device;

Fig. 2 is a view of the strainer embodied in Fig. 1;

Fig. 3 represents the three-way valve in another position from that shown in Fig. 1, and Fig. 4 represents, on a reduced scale, a wrench suitable for operating various stop cocks embodied in the device.

In the drawings, 1 is a fuel supply tank having an outlet pipe 4 provided with a valve or cock 5. The pipe 4 terminates near the bottom of fuel trap 2 into which it extends, so as to deliver fuel into said trap near its bottom. The trap 2 has a slightly concave or dished bottom as shown at 3. A plug 6 is secured in the said bottom, as by screw threads, so as to be readily removed when desired, and in turn is connected with the end of pipe 7, having therein a valve or cock 8. The trap 2 may be of any desired suitable material, preferably metal, and the seams may be welded or soldered or sealed in any other well known manner.

In order to preheat the fuel, a pipe 14 having therein a three-way valve 12, is provided, and enters the trap through the top of the latter, has a coiled or worm like portion in the trap, and leaves at or near the bottom of the trap. This pipe is used to convey steam or other heating fluid in heat interchanging relation with the fuel in the trap and obviously the temperature of the fuel in the trap may be controlled as desired by a proper adjustment of valve 12, when in the position shown in Fig. 1, to admit more or less of the heating fluid, as with any ordinary valve or cock, or to shut the flow of fluid off entirely when desired, as by a quarter turn in a clockwise direction.

The heated fuel is led to the burners, or other device to be supplied with fuel, by means of the gradually contracted member 15, connected with pipe 9, which has a valve or cock 19 therein to control the flow. A pipe 11, hereinafter referred to as the bypass, is connected to the lateral outlet of the three-way valve 12, at its one end, and is connected to pipe 9 by means of a T member 10 at its other end. It may be remarked that these pipes are shown diagrammatically only, and that in practice the necessary pipe fittings would be used to enable the proper assembly of the device in well known ways.

A strainer, which comprises a disk 17 having a plurality of apertures 18 therein, is interposed in any desired way between the member 15 and the interior of the trap 2, so that no fuel can enter pipe 9 except through said strainer. Thus any foreign matter which might otherwise clog or obstruct the burners will be prevented from entering the pipe 9.

A thermometer 16 may be provided to show the temperature of the fuel, if desired, the bulb of the same being inside member 15 as shown in dotted lines.

In operation, the valves or cocks are adjusted into the positions shown in Fig. 1. Cock 5 is open, cock 8 is closed, cock 19 is open and three-way cock 12 is so positioned as to open pipe 14, but close pipe 11. Therefore fuel flows from tank 1 into trap 2, and out through strainer disk 17, member 15, pipe 9 and valve 19, to the burners (not shown). Steam or other heating fluid flowing through the coiled portion of pipe 14, serves to heat the fuel contained in the trap. By reading the thermometer 16 and properly adjusting the valve 12 the fuel is therefore preheated to the proper desired temperature. It is obvious that the fuel will be more readily and completely vaporized if preheated, hence it is deemed unnecessary to give a detailed statement of the objects of the preheating.

Should it be necessary or desirable to clean out or flush the trap, this may be done by closing cocks 5 and 19, and removing plug 6 which gives ready access to the interior of the trap, the plug being returned after the cleaning operation has been completed. In some cases it may be found sufficient merely to open cock 8 to drain the trap of sediment and foreign matter.

In emergency cases, as where the strainer becomes fouled or clogged, so that it is impossible to feed fuel properly through the latter, while the fuel burner is in use, the three-way valve 12 is adjusted into the position shown in Fig. 3, cocks 5 and 19 being first closed and cock 8 opened, whereby steam or other heating fluid may be blown directly through the pipe 11, member 15, strainer disk 17, trap 2, pipe 7 and valve 8 so as to remove the obstruction without necessitating a long shut-down of the burners. When the obstructions are removed the valves or cocks are of course returned to the normal operating positions shown in Fig. 1.

While the trap 2 shown is entirely independent of the main fuel tank 1, it is obvious that said trap may be placed in any desired location, and should limitation of space make it necesssary or desirable, it might be placed in a recess in the main tank. It is also clear that although the trap is shown in an upright position, it may be in some cases desirable to place it otherwise, and therefore it is to be understood that the trap is not necessarily vertical, but may be inclined or even horizontally arranged.

The lazy knuckle wrench shown in Figure 4 may be used to actuate the various stop cocks embodied in the device. It consists of three essential parts, 20, 21 and 22, connected by pivots, as shown, the portion 21 acting as a "universal joint," so that socket 22 may be engaged with the cocks to be operated, and power applied to member 20 to turn the socket through said universal joint. Thus these stop cocks may be operated when in otherwise inaccessible positions, and when ordinary wrenches would be inconvenient because of obstructions, and also because of the heat which would be encountered by the hands of the operator in approaching too close to the device. A bleed cock 23 is also provided in the outlet portion of pipe 14 and is used to provide circulation of steam in said pipe when the outlet of the pipe is otherwise closed. It will be understood, of course, that the steam from pipe 14 need not exhaust to the atmosphere, but is preferably used elsewhere as a source of heat or power, and when for any reason such source is not in action, it becomes necessary to open the bleed cock to provide the proper flow of steam in heating coil.

While I have shown diagrammatically a preferred embodiment of my invention, it is of course obvious that modifications may be made in the specific structures without departing from the spirit of the invention.

What I claim as my invention is:

1. In a fuel preheating device, means for normally bringing fuel and a heating medium into heat exchanging relation with each other, and means for directing a portion of the heating medium into the device in contact with a fuel containing portion of the device, in a direction reverse to the normal direction of flow of fuel therein whereby the said medium may remove obstructions from the fuel passages of the device.

2. In a fuel preheating device having a fuel trap, a heating coil in said trap, a fuel drain, a fuel inlet, and a fuel outlet, a by-pass connecting the fuel outlet with the heating coil.

3. In a fuel preheating device having a fuel trap, a heating coil in said trap, a fuel drain, a fuel inlet, and a fuel outlet, a by-pass connecting the fuel outlet with the heating coil, and a valve in said by-pass.

4. In a fuel preheating device having a fuel trap, a heating coil in said trap, a fuel drain, a fuel inlet, a fuel outlet, a by-pass connecting the fuel outlet with the heating coil, and a valve in said heating coil.

5. In a fuel preheating device having a fuel trap, a heating coil in said trap, a fuel drain, a fuel inlet, a fuel outlet, a by-pass connecting the fuel outlet with the heating coil, and a three-way valve controlling the connection between said heating coil and said by-pass.

6. In a fuel preheating device having a fuel trap, a fuel inlet conduit extending downwardly within the trap, and discharging at a point near the bottom of the trap, a fuel outlet member, through which the heated fuel is discharged, near the top of the trap, and a fuel heating coil disposed within the trap between the discharge end of the conduit and the said fuel outlet member and encircling the said conduit.

7. In a fuel preheating device comprising a trap, a heating medium conveying conduit, a fuel outlet having a strainer therein and a drain outlet, means for diverting heating medium from the first named conduit and discharging said medium through the strainer to clear the latter.

8. In a fuel preheating device comprising a trap, a steam conveying heating coil, a fuel outlet having a strainer therein and a drain outlet, means for diverting steam from the coil to the fuel outlet and discharging said steam through the strainer to clear the latter.

9. In a fuel preheating device comprising a trap, a heating coil, a fuel outlet having a strainer therein and a drain outlet, means for simultaneously providing a flow of heating medium through the coil and another flow into the fuel outlet discharging through the strainer to clear the latter.

In testimony whereof I affix my signature.

PHILIP D. BARRY.